United States Patent [19]
Tomoyasu et al.
[11] Patent Number: 4,959,260
[45] Date of Patent: Sep. 25, 1990

[54] MESH FABRIC FOR PRINTING SCREEN

[75] Inventors: Haruo Tomoyasu; Chobe Tango, both of Katsuyama; Takuo Omote; Yoshinori Kato, both of Fukui, all of Japan

[73] Assignees: Nihon Tokushu Orimono Co., Ltd., Fukui; Kanebo Ltd., Tokyo, both of Japan

[21] Appl. No.: 269,186
[22] PCT Filed: Aug. 10, 1987
[86] PCT No.: PCT/JP87/00601
§ 371 Date: Dec. 19, 1988
§ 102(e) Date: Dec. 19, 1988
[87] PCT Pub. No.: WO88/06103
PCT Pub. Date: Aug. 25, 1988

[30] Foreign Application Priority Data
Feb. 17, 1987 [JP] Japan .................................. 62-35252

[51] Int. Cl.[5] .............................................. B32B 7/00
[52] U.S. Cl. .................................. 428/255; 428/225; 428/230; 428/257; 428/373
[58] Field of Search ............... 428/225, 230, 255, 373, 428/257

[56] References Cited

U.S. PATENT DOCUMENTS 4,824,717 4/1989 Nakanishi et al. .................. 428/255

FOREIGN PATENT DOCUMENTS 143688 8/1984 Japan .
159349 9/1984 Japan .

*Primary Examiner*—James J. Bell
*Attorney, Agent, or Firm*—Morgan & Finnegan

[57] ABSTRACT

The mesh fabric is advantageously applicable for producing a printing screen. The mesh fabric consists essentially of conjugate monofilaments each having a core and a sheath. The sheath is formed of a material having high adhesive property to an emulsion and a resin used for making the screen. The core is formed of a material having high dimensional stability and elastic recovery property. The mesh fabric has a breaking elongation of from 15 to 40% and a breaking strength of not less than 25 kgf, and a correlation between the strength (kgf) and the elongation (%) in the elongation range of not less than 5%, in the stress-strain curve of the mesh fabric by the labelled strip method at the specimen width of 5 cm and the grip interval of 20 cm satisfying the following formula:

$$Y \geqq (X+1) \times 5/3.$$

The mesh fabric, which comprises such special sheath and core type conjugate filaments, is significantly improved in the dimensional stability and the adhesive property to resins. Production of a printing screen with high precision and workability is enabled. The mesh fabric, which has a relatively high strength and a corelation between the strength and the elongation in the special range as mentioned above, affords to produce a screen having small elongation at high tension and high printing stability.

11 Claims, 10 Drawing Sheets

MESH FABRIC FOR PRINTING SCREEN

TECHNICAL FIELD

The present invention relates to a mesh fabric useful for a printing screen which consists essentially of conjugate filaments.

BACKGROUND OF THE INVENTION

In the past, as fabrics for printing screens, silk or stainless-steel mesh fabrics have been broadly used. However, the silk mesh fabrics were deficient in the strength and the dimensional stability for a printing screen. As regards the stainless steel mesh fabrics, severe problems were found in the elastic recovery and the instantaneous repelling force when a squeegee was applied. Further, silk and stainless are expensive.

Recently, for the above reasons, polyester or nylon mesh fabrics have been more used for printing screens. Particularly, the polyester mesh fabrics have been more preferred from the viewpoint of the high dimensional stability. However, the polyester mesh fabrics have the following disadvantages:

(a) White-powdery scum is generated during the weaving, which will cause many troubles.
(b) The emulsion-coating properties is low.
(c) For forming a coating film at a constant thickness, skillful techniques and several overlap coatings are required.
(d) The production efficiency is low.
(e) The adhesion of the meshes to an emulsion resin is insufficient. The printing durability is low.

In attempt to solve the above problems, various ways utilizing chemical treatment with acids or alkalies or the like, flame treatment, corona-discharge treatment, and so forth have been examined. However, various troubles such as reduction in the strength of the material and so forth have arised. The test results of the screens prepared in such ways have been unsatisfactory for practical application.

On the other hand, with diversification in the printing fields, high printing precision and high printing durability have been more required. Particularly, it is needed to develop a screen which has a high dimensional stability comparable to that of a stainless-steel screen, a high adhesion to an emulsion resin comparable to that of a nylon screen, and a high elastic recover property comparable to that of a polyester screen.

Japanese Laid-Open Patent Publication No. 142,688 of 1984 discloses an anti-static mesh fabric made from conjugate filaments. The anti-static mesh fabric is characteristic in that it is made from a theremoplastic synthetic polymer added with electro-conductive carbon black. An object of that lies in an improvement in the antistatic property of a screen mesh fabric. However, there is not taught any way for improvement of printing precision and printing durability which have been much desired as described above.

Accordingly, an object of this invention is to provide a mesh fabric useful for a printing screen having high dimensional stability, adhesion to an emulsion resin and elastic recovery property, that is, having high printing precision and printing durability.

DISCLOSURE OF THE INVENTION

In accordance with the invention, the mesh fabric consists essentially of conjugate filaments each composed of a sheath and a core. The material of the sheath has a high adhesive property to an emulsion and a resin of the screen, and the material of the core has a high dimensional stability and an elastic recovery property. The mesh fabric has a breaking elongation X (%) of from 15 to 40% and a breaking strength Y (kg·f) of not less than 25 kgf by the labelled strip measurement method at the specimen width of 5 cm and the grip interval of 20 cm, said breaking elongation X (%) and said breaking strength Y (kg·f) satisfying following formula: $Y \geqq (X+1) \times 5/3$, in the range of the elongation of not less than 5%.

The desired end of this invention can be achieved by using different synthetic fibre materials as a conjugate filament to act usefully whereby the composite filament can be provided only the good properties of each materials.

As the material of the core, polyesters, polyolefins or the like having a high dimensional stability and an elastic recovery property are used to afford screens having high dimensional stability. As the material of the sheath, polyamides, low viscosity type polyesters or the like having a high adhesive property to resins are used to present generating white-powdery scum as often found during the weaving of conventional polyester screens and to afford screens having high strength and emulsion-coating properties and ink-squeezing properties.

Accordingly, the mesh fabric of the invention can always be produced with high efficiency and can be used to produce printing screens having high printing precision and printing durability.

As understood from the preceding, the present mesh fabric is so designed as to have the strength and the elongation within the above-described range, typically by selecting materials for the conjugate filament and heat-setting the mesh fabric, whereby the workability of the mesh fabric during the stretching stage for producing a screen, the dimensional stability of the screen, and the high-tension printing durability of the screen during the printing stage are remarkably enhanced, which enables the present mesh fabric to be applied for high precision printing.

One of the characteristics of the present mesh fabric lies in that it has such an appropriate breaking elongation for a printing screen as is unobtainable with conventional stainless-steel mesh fabrics, and the breaking strength considerably higher than that of conventional synthetic fibre mesh fabrics, and has such a low elongation and a high strength that the stress-strain curve satisfies the formula $Y \geqq (X+1) \times 5/3$ where Y designates the strength (kg·f) and X the elongation (%), in the range of the elongation of not less than 5%. Accordingly, the present mesh fabric is applicable for producing a printing screen having a small elongation at a high tension. Typically, the present mesh fabric affords to produce a high-tension printing screen having a tension of not more than 0.6 by measurement with a Type 75 B tension gauge (made by Sun Giken), which is unobtainable with conventional synthetic fibre mesh fabrics, with high workability.

Polyester or polyolefin which constitutes the core of the conjugate filament used in the invention must be a material of which the viscosity at a spinning temperature depending of the type of the material is appropriate for the spinning.

As the polyester, there may be used polyalkyleneterephthalate, polyalkylene-telephthalate copolymer, poly[1,4-cyclohexanediol.terephthalate] and the like. From the viewpoint of the high dimensional stability of the mesh fabric needed for the heat-setting in the processing stage after the weaving, polyethyleneterephthalate, polybutyleneterephthalate, and poly [1,4-cyclohexanediol.terephthalate] are preferable. Polyethyleneterephthalate is most preferred from the economical viewpoint.

As the polyolefins, there may be used polyethylene, polypropylene, polybutene-1 and the like. Polyethylene and polypropylen are preferable, because of the high stability during the spinning and the easy handling. Polypropylene, which is effective in a relatively wide range of the spinning temperature, is most preferable.

On the other hand, as the polyamides constituting the sheath of the conjugate filament, there may be used aliphatic polyamides such as 6-nylon, 6,6-nylon, 6,10-nylon, nylon 12, condensation polyamides of para-aminocyclohexylmethane and dodecanedioic acid; and aromatic polyamides such as polyxylyleneadipamide, polyhexyamethylenephthalamide and the like. 6-nylon and 6,10-nylon are preferably used from the economical viewpoint and for the easy spinning.

As regards the constitution of the conjugate filament, it is important that the sheath is continuously present in the whole periphery of the conjugate filament without the core exposed to the surface. The conjugate filament may be circular in the section. Particular restrictions are not imposed on the arrangement and shape of the core. The core may be single- or multi-core, circular or profile in the section, and concentric or eccentric. From the viewpoint of the dimensional stability, it is preferred that the filament contains concentrically a single-core with a circular section, or contains a type of multi-cores each having a circular section, since such arrangement and shape prevents effectively an applied stress from being distributed in the filament.

Preferably, the volume ratio of core to sheath is in the range of from 1:5 to 3:1, and more preferably in the range from 1:2 to 2:1. If the volume ratio of core to sheath is inadequately high, the sheath film is relatively thin, so that irregularities in the thickness of the film will occur during the spinning and cause breakage of the film, which leads to breakage of the film when it undergoes an external stress during the weaving, the mesh fabric stretching on frame, or the printing. If the volume ratio of the core to the sheath is inadequately small, the conjugate filament will have an insufficient resistance to tensile stress, which brings a deficiency in the dimensional stability to the screen.

The conjugate filament is applicable in form of a monofilament or a multi-filament in this invention. For the purpose of obtaining a screen having high printing precision, the conjugate filament in form of a monofilament is generally preferred. The size of the filament is preferably not less than 1 denier, and more preferably in the range of from 5 to 50 deniers. The preferable diameter of the filament is not more than 100 μm.

For weaving, the conjugate filament is generally used as a drawn yarn. For ensuring the dimensional stability of the screen, the drawing ratio and the heat set temperature is set so that the strength of the drawn filament is not less than 5.5 g/d, and the residual elongation is in the range of from 30% to 50%, and the heat shrinkage is not more than 10%. Preferably, the drawn yarn has a strength of not less than 6 g/d, the residual elongation of from 35% to 45%, and a boiling water shrinkage of not more than 9%.

In general, the density of the mesh fabric is in the range of from 10 to 600 per inch (that is, 100–600 mesh plain weave). Depending on the nature of the screen, that is, the supply amount of printing ink, the line width of pattern and so forth, an adequate density needs to be selected. A preferred density is in the range of from 100 to 350 per inch.

The raw fabric obtained by weaving the conjugate filaments is washed with an aqueous solution of a non-ionic or anionic surface active agent, and heat-set at a temperature of from 100° C. to 190° C. with a tension of from 100 to 250 kg to obtain the desired thickness and mesh number.

After the heat-setting, the mesh fabric is cleaned in the surface, dried and subjected to the stretching stage for fixing the mesh fabric to the frame of a screen. The present mesh fabric may be applied for any frame of aluminum, iron, wood and resin.

The mesh fabric of the invention, obtained from the above-mentioned conjugate filaments, undergoes substantially no changes in the quality with the lapse of time. Accordingly, the mesh fabric is applicable to the following coating stage using a photosensitive or heat-sensitive resin emulsion after being left for 24 hours from being fixed on the frame as mentioned above. Using the mesh fabric, the workability for producing a screen stencil can be remarkably improved.

On the other hand, the conventional nylon mesh fabrics, when stretched on the frame of a screen, suffer significant changes in the quality with the lapse of time, and are unsuitable for precision screen printing. Also, conventional polyester mesh fabrics need to be left as they are for more than 72 hours from the stretching stage, because of the large change in the quality with the lapse of time.

For producing a screen stencil, commercially available photosensitive or heat sensitive resin emulsions are applicable to the mesh fabric of the invention. As the photosensitive agent, dichromates such as ammonium dichromate and the like, diazo compounds are applicable. As the emulsion resin, gelatin, gum arabic, vinylalcohol, vinylacetate, acrylic resin and mixtures thereof are applicable. Additives such as an emulsifier, an anti-static agent and the like may be added in the emulsion.

Although the coating thickness of an emulsion applied to the mesh fabric will be varied, depending on the desired nature of the screen, the mesh fabric according to the invention, the surface of which is covered with apolyamide having high adhesive property to the emulsion to be applied, is significantly improved in the emulsion coating property, as compared with conventional polyester mesh fabrics, so that a resin layer uniform in the thickness can be easilly formed thereon.

In the ordinary way, an emulsion is applied to the mesh fabric to a predetermined thickness, dried and then exposed to light or heated for obtaining a screen stencil. For curing the resin in a pattern, generally, high voltage mercury lamps, xenon lamps (about 4 kw) are used as the light source. The distance between the light source and the screen is in the range of from 1 to 1.5 m, and the exposure time is in the range of from 2 to 5 minutes. The integrated quantity of light is in the range of from 300 to 500 milli-jules/$cm^2$.

The screen stencil obtained with the mesh fabric of the invention as described above is improved in the dimensional stability and the elastic recovery property, and has high printing precision and printing durability. For preventing blurring or fogging of the pattern formed on the screen which is caused by halation when the screen is exposed to light according to the process, it is preferred that the conjugate filament is treated in such a manner that at least the surface of the core of the conjugate filament is rendered light-absorptive to the exposure light during the process.

The above-mentioned light-absorptive property may be given by dyeing the mesh fabric after the weaving by dope-coloring the sheath material of the conjugated filament with pigments or dyes or by incorporating a ultra-violet ray absorbing agent in the sheath material of the conjugate filament.

The mesh fabrics obtained from conventional polyester filaments need to be high-pressure dyed for the dyeing, accompanied with low production efficiency. Further, the mesh fabrics are ready to undergo heat shrinking during the high-pressure dyeing and having foreign matters adhere to the surface thereof. Accordingly, the conventional mesh fabrics are unsuitable for producing a printing screen having a fine pattern with high efficiency.

However, according to the invention, since the conjugate filament in which the sheath is a polyamide having a good dyeing property can be used, the filament can be dyed under the ordinary pressure. Accordingly, the mesh fabric according to the invention can be rendered halation-preventive to the exposure light in the photometrical process, without substantial shrinking of the fabric and without substantial foreign materials adhered to the surface during the dyeing process.

Further, in the invention, a pigment or an ultraviolet ray absorbing agent may be incorporated in the sheath material of the conjugate filament to obtain the mesh fabric having a stable halation-preventive property without dyeing. In this case, since the desired effect can be obtained by incorporating the pigment or the like only in the sheath material of the conjugate filament, there can be very economically produced a screen stencil having good halation-preventive property without heat-shrinking of the mesh fabric and without foreign materials adhered to the surface of the filament. Accordingly, screen stencils having fine patterns with high density can be precisely produced.

Generally, the wavelength of the light employed in the photometrical process has a peak within the range of 280 to 450 nm. It is preferred that the conjugate filament is treated in such a manner as to have a light absorptive property to the light within the wavelength range of 280 to 450 nm, depending on the light employed in the photometrical process.

DETAILED DESCRIPTION OF THE PREFERRED EMBODIMENTS

Figure 1:
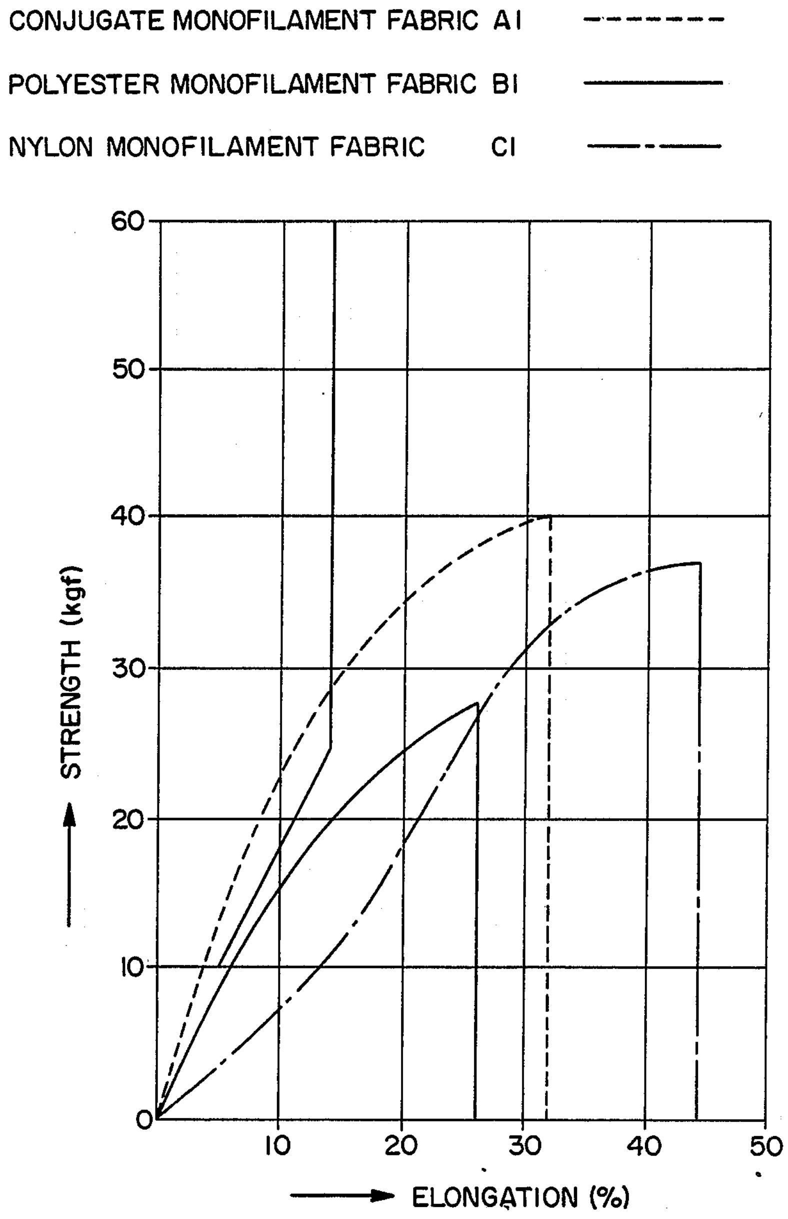
FIG. 1 illustrates, in graphical comparison, the stress-strain curves of a mesh fabric with the mesh size of 150 made of conjugate monofilaments (fibre diameter: 48 μm) according to the invention and a mesh fabric with the mesh size of 150 made of polyester filaments (fibre diameter: 48 μm).
Figure 2:
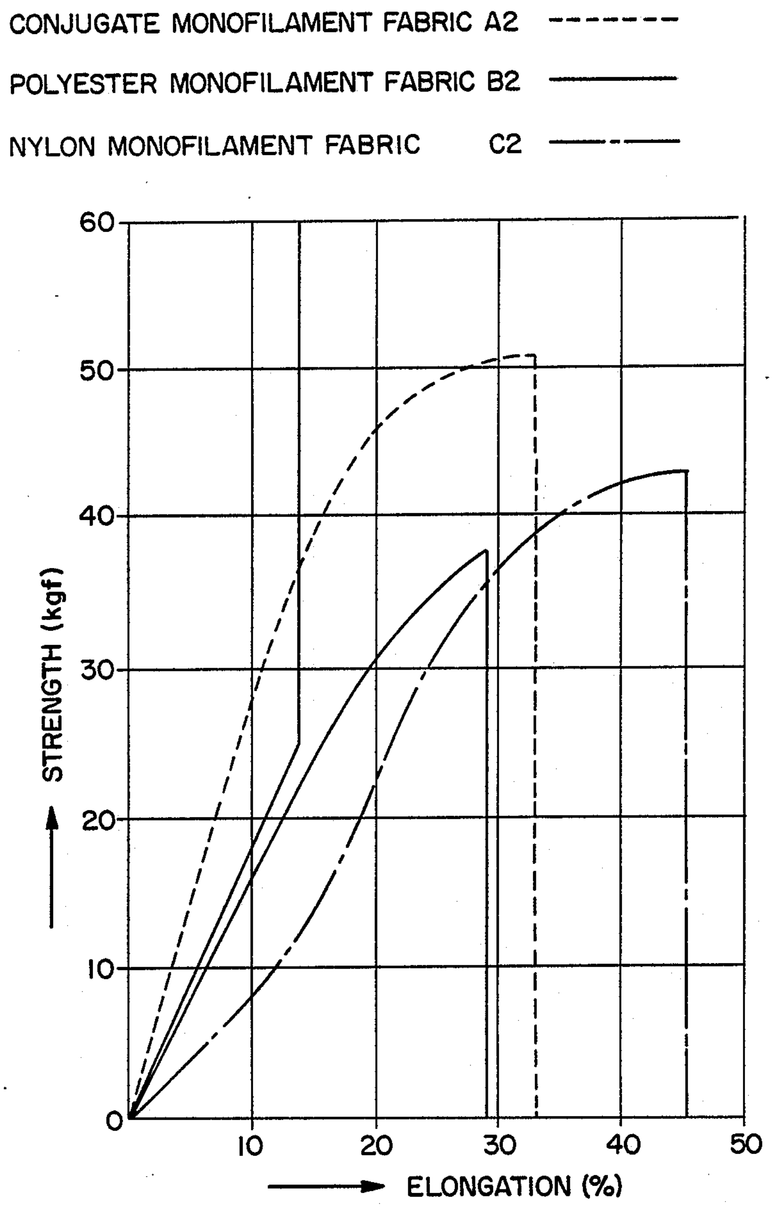
FIG. 2 illustrates, in graphical comparison, the stress-strain curves of a mesh fabric with the mesh size of 200 made of conjugate monofilaments (fibre diameter: 48 μm) according to the invention and a mesh fabric with the mesh size of 200 made of polyester filaments (fibre diameter: 48 μm).
Figure 3:
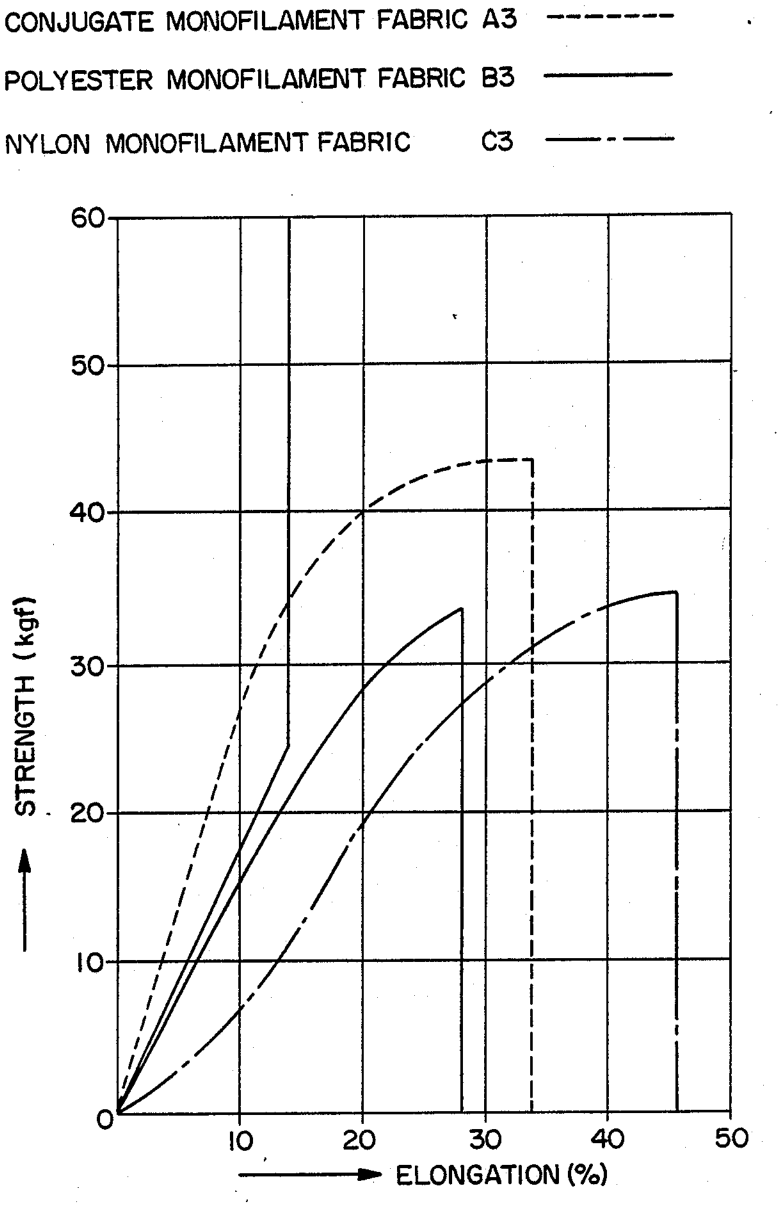
FIG. 3 illustrates, in graphical comparison, the stress-strain curves of a mesh fabric with the mesh size of 250 made of conjugate monofilaments (fibre diameter: 40 μm) according to the invention and a mesh fabric with the mesh size of 250 made of polyester filaments (fibre diameter: 40 μm).
Figure 4:
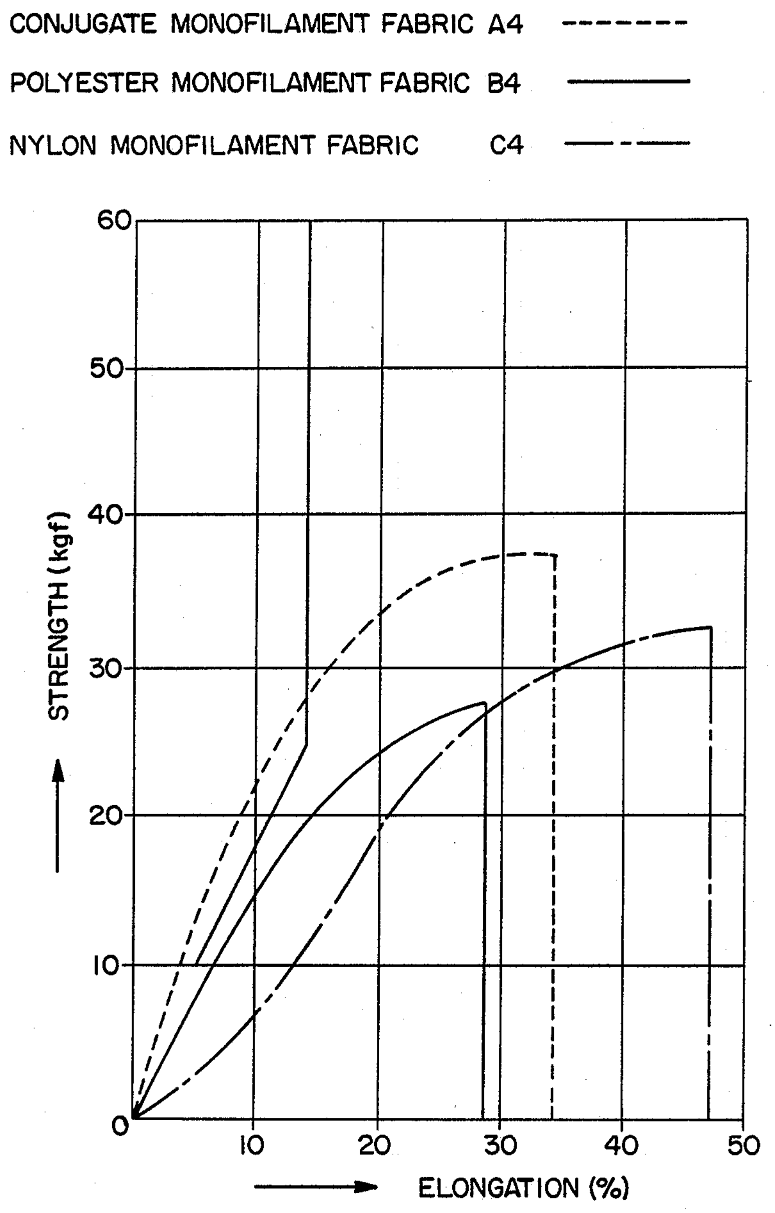
FIG. 4 illustrates, in graphical comparison, the stress-strain curves of a mesh fabric with the mesh size of 270 made of conjugate monofilaments (fibre diameter: 34 μm) according to the invention and a mesh fabric with the mesh size of 270 made of polyester filaments (fibre diameter: 34 μm).
Figure 5:
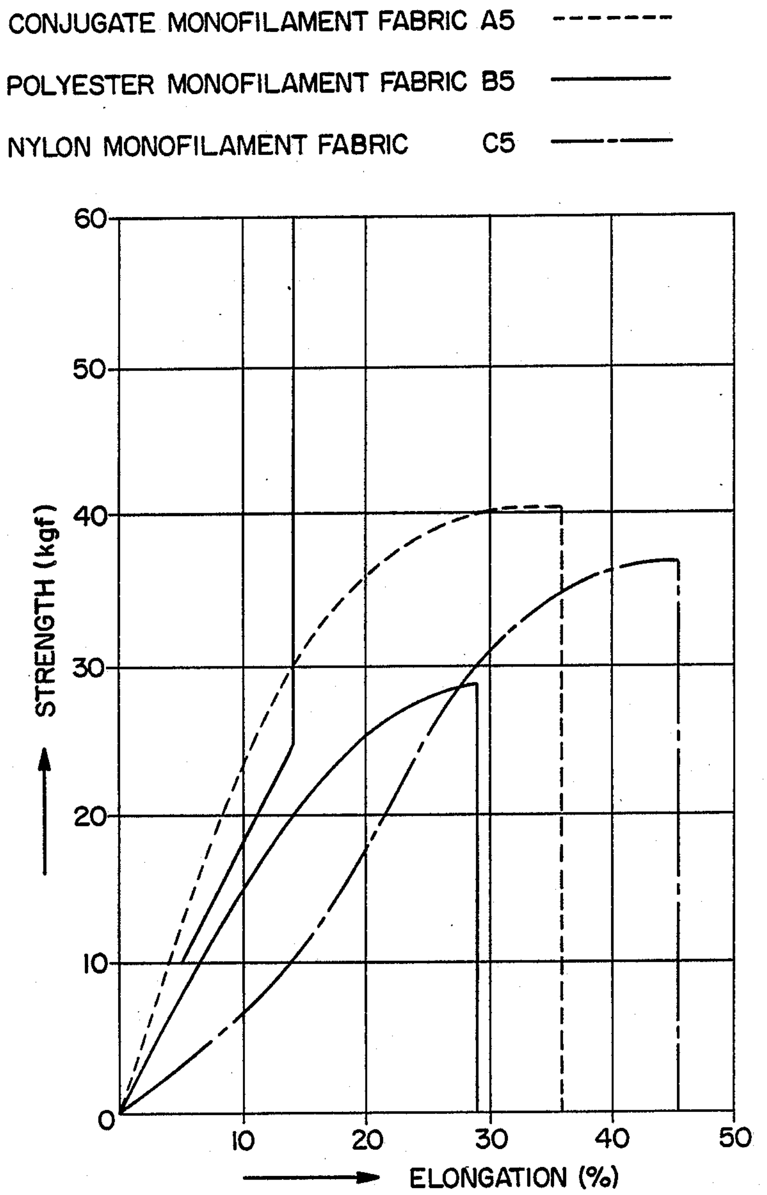
FIG. 5 illustrates, in graphical comparison, the stress-strain curves of a mesh fabric with the mesh size of 300 made of conjugate monofilaments (fibre diameter: 34 μm) according to the invention and a mesh fabric with the mesh size of 300 made of polyester filaments (fibre diameter: 34 μm).

The invention will be illustrated by way of the following examples which are for the purpose of illustration only and are in no way to be considered as limiting.

Example 1

Circular-section concentric conjugate filaments comprising a 6 nylon sheath and a polyethyleneterephthalate core in the volume ratio of sheath to core of 1:1 were prepared at the spinning temperature of 285° C. and the winding speed of 1,000 m/min., and drawn to the draw ratio of 3.90 at the drawing temperature of 84° C. and the orientation set temperature of 180° C., so that three types of conjugate filaments with the fibre diameter of 48 μm, 40 μm and 34 μm were obtained.

Five types of mesh fabrics as listed in Table 1 were prepared from the conjugate filaments. After heat-setting the fabrics, the strength and elongation were measured. Table 1 lists the measurement results in comparison with the measurements of polyester mesh fabrics having the same fibre diameter and mesh size as those of the mesh fabrics of the composite filaments, respectively.

TABLE 1

| No. | Mesh | Types of fabrics: Fibre materials | Average strength (kgf) | Average elongation (%) |
|---|---|---|---|---|
| A1 | 150 | conjugate monofilament 48 μm | 40.0 | 31.7 |
| B1 | 150 | polyester monofilament 48 μm | 28.0 | 26.0 |
| A2 | 200 | conjugate monofilament 48 μm | 51.0 | 33.7 |
| B2 | 200 | polyester monofilament 48 μm | 38.0 | 29.0 |
| A3 | 250 | conjugate monofilament 40 μm | 43.8 | 33.6 |
| B3 | 250 | polyester monofilament 40 μm | 33.8 | 28.0 |
| A4 | 270 | conjugate monofilament 34 μm | 37.9 | 34.3 |
| B4 | 270 | polyester monofilament 34 μm | 28.3 | 28.5 |
| A5 | 300 | conjugate monofilament 34 μm | 40.4 | 35.9 |
| B5 | 300 | polyester monofilament 34 μm | 29.2 | 29.2 |

| | |
|---|---|
| Test Method | according to the labelled strip method of JIS L 1068 (1964) |
| Testing Machine: | constant-speed tension tester (prepared by Shimadzu Corporation, Type-500) |
| Test Conditions: | 20° C., 65% R.H. environments specimen width of 5 cm, specimen grip-distance of 20 cm, tension speed of 10 cm/min. |
| Number of Experimental Times: | 50 |

FIGS. 1 to 5 show the stress-strain curves of the mesh fabrics A1 to A5 and B2 to B5 as listed in Table 1, and conventional nylon mesh fabrics C1 to C5. The test conditions were the same as above-described. The materials and the mesh size of the mesh fabrics C1 to C5 were as follows C1: 150 mesh fabric made of nylon monofilaments of 50 μm fibre diameter C2: 200 mesh fabric made of nylon monofilaments of 50 μm fibre diameter.

C3: 250 mesh fabric made of nylon monofilaments of 39 μm fibre diameter

C4: 270 mesh fabric made of nylon monofilaments of 39 μm fibre diameter

C5: 300 mesh fabric made of nylon monofilaments of 39 μm fibre diameter

As understood from Table 1, and FIGS. 1 to 5, the mesh fabrics A1 to A5 have a moderate elongation and a very high strength as compared with that of the conventional screen materials B1 to B5 and C1 to C5. Also, the mesh fabrics A1 to A5 according to the invention satisfy the formula $Y \geqq (X+1) \times 5/3$ when the elongation Y (%) is not less than 5%, with respect to the stress-strain curve. On the contrary, the conventional screen materials B1 to B5 and C1 to C5 exhibit a stress-strain curve where the gradient is relatively small, and the elongation is far from satisfying the above formula.

Table 2 tabulates the generation state of white-powdery scum of the fabrics A2, B2, A3, B3, A5 and B5, as listed in Table 1, during the weaving.

The fabrics A2 and B2 were 200 mesh fabrics woven with 18,800 warps at the weft filling rate of 230 times/min.

The fabrics A3 and B3 were 250 mesh fabrics woven with 23,500 warps at the weft filling rate of 230 times/min.

The fabrics A5 and B5 were 300 mesh fabrics woven with 28,200 warps at the weft filling speed of 210 times/min.

All the fabrics were woven by means of a Sulzer weaving machine. During weaving, when the scum was considerably generated, air was sprayed on the reed with an airgun to remove the scum.

TABLE 2

| No. | Type of fabrics: Fibre materials | Operation rate % | White-powdery scum: Reed cleaning (m/time) | White-powdery scum: Evaluation |
|---|---|---|---|---|
| A2 | conjugate monofilament | 96 | 5,000 | ⊚ |
| B2 | polyester monofilament | 91 | 300 | ○ |
| A3 | conjugate monofilament | 97 | 4,500 | ⊚ |
| B3 | polyester monofilament | 92 | 180 | Δ |
| A5 | conjugate monofilament | 98 | 3,000 | ⊚ |
| B5 | polyester monofilament | 90 | 140 | X |

Evaluation
⊚White-powdery scum is scarcely generated.
○: The remaining ratio of white-powdery scum is up to 20%.
Δ: The remaining ratio of white-powdery scum is more tha 20% up to 50%.
X: The remaining ratio of white-powdery scum is more than 50%.

The test results of Table 2 indicate that the fabrics A2, A3 and A5 according to the invention could be so woven as to superior qualities substantially without generation of white-powdery scum.

Example 2

The mesh fabrics as described in Example 1 were heat-set, and fixed to an aluminum frame with a screen stretching machine. During the procedure, the compressor pressure of the screen stretching machine was measured with changing the tension of the mesh fabrics. At the same time, the elongation of the mesh fabrics was examined by marking at a 50 cm distance in the center of the mesh fabrics in both of warp and weft directions and measuring the changes of the distance.

Table 3 shows the relation of the tension of the mesh fabrics to the compressor pressure of the screen stretching machine and further the elongation of the mesh fabrics. Table 4 shows the changes of the tension of the mesh fabrics with the lapse of time. The symbols A2, A3, A5, B2, B3 and B5 designate the same mesh fabrics as described in Example 1, respectively.

The used test apparatus were as follows:

| | |
|---|---|
| Screen stretching machine: | 3 S Air Stretcher manufactured by Mino Group |
| Aluminum frame: | 880 mm × 880 mm frame width of 40 mm, frame thickness of 25 mm |
| Tension meter: | Type 75 B Tension Gauge manufactured by Sun Giken |

TABLE 3

| Tension (mm) | Compressor pressure ($kg/cm^2$): conjugate monofilament fabrics | Compressor pressure ($kg/cm^2$): polyester fabrics | Elongation (%): conjugate monofilament fabrics | Elongation (%): polyester fabrics |
|---|---|---|---|---|
| | A2 | B2 | A2 | B2 |
| 1.00 | 6.2 | 6.5 | 3.4 | 6.1 |
| 0.90 | 6.8 | 7.3 | 4.4 | 7.6 |
| 0.80 | 7.2 | 8.0 | 5.2 | 9.6 |
| 0.70 | 8.5 | 9.5 | 6.2 | 11.8 |
| 0.60 | 9.0 | rupture | 6.6 | rupture |
| | A3 | B3 | A3 | B3 |
| 1.00 | 6.0 | 6.5 | 4.6 | 7.3 |
| 0.90 | 6.8 | 7.0 | 5.2 | 9.6 |
| 0.80 | 7.3 | 8.3 | 6.2 | 10.4 |
| 0.70 | 8.3 | 9.0 | 7.6 | 12.7 |
| 0.60 | 9.0 | rupture | 8.8 | rupture |
| | A5 | B5 | A5 | B5 |

TABLE 3-continued

| | Compressor pressure (kg/cm²) | | Elongation (%) | |
|---|---|---|---|---|
| Tension (mm) | conjugate monofilament fabrics | polyester fabrics | conjugate monofilament fabrics | polyester fabrics |
| 1.00 | 6.2 | 6.8 | 5.0 | 8.3 |
| 0.90 | 7.0 | 8.0 | 5.8 | 10.5 |
| 0.80 | 8.0 | 8.6 | 7.2 | 12.5 |
| 0.70 | 8.5 | rupture | 8.4 | rupture |
| 0.60 | 9.5 | — | 9.0 | — |

TABLE 4

| | Changes of tension (mm) | | |
|---|---|---|---|
| Time (hr) | conjugate monofilament fabrics (A2) | polyester fabrics (B2) | nylon fabrics (C2) |
| 0 | 1.00 | 1.00 | 1.00 |
| 6 | 1.02 | 1.03 | 1.04 |
| 12 | 1.03 | 1.05 | 1.07 |
| 24 | 1.03 | 1.06 | 1.09 |
| 48 | 1.03 | 1.07 | 1.11 |
| 72 | 1.03 | 1.07 | 1.12 |
| 96 | 1.03 | 1.08 | 1.13 |
| 120 | 1.03 | 1.07 | 1.14 |
| 144 | 1.03 | 1.08 | 1.15 |
| 168 | 1.03 | 1.08 | 1.16 |

The test results in Tables 3 and 4 indicate that the mesh fabrics A2, A3 and A5 can be stretched to form a screen by application of a high tension with high workability and stability. On the contrary, in the case of the conventional polyester mesh fabrics B2, B3 and B5, the elongation is accerately increased as the tension becomes higher. The conventional mesh fabrics are difficult to be stretched with stability for formation of the screen. The conventional mesh fabrics have limitations to the application of tension. As to the change of the tension after stretching, the conventional mesh fabrics of polyester (B2) and nylon (C2) exhibit significant changes. Particularly, the tension of the nylon mesh fabric C2 exhibits no constant value one week after stretching.

Example 3

The tribo-electrification voltage, the half-life, and the leak resistance of the present mesh fabrics were measured, and compared with those of a conventional polyester mesh fabric, a low-temperature plasma-treated polyester mesh fabric, and an anti-static treated polyester mesh fabric. Table 5 shows the measurement results.

The test method is as follows:

Tribo-electrification voltage: measured by Kyodai Kaken Type Rotary Stick Tester(manufactured by Koa Syokai).

Cloth to be rubbed against the mesh fabrics—cotton shirting Number 3 revolution speed—450 rpm load—500 g friction time—60 sec.

Leak resistance: measured by SM-5 ultra-insulation resistance tester (manufactured by ToaDenpa Kogyo) at the temperature of 20° C. and the RH of 40% according to JIS G-1026.

TABLE 5

| type of fabrics | tribo-electrification voltage (V) | half-life (sec) | leak resistance (Ω) |
|---|---|---|---|
| conjugate monofilaments fabric | 480 | 2 | $2 \times 10^9$ |
| untreated polyester fabric | 5,200 | 60< | $2 \times 10^{13}$ |
| plasma-treated polyester fabric | 6,200 | 60< | $2 \times 10^{13}$ |
| anti-static treated polyester fabric | 540 | 2 | $3 \times 10^{10}$ |

The test results indicate that the fabric according to the invention causes no troubles by static electricity in printing process, and is useful as a printing screen.

Example 4

The mesh fabrics as listed in Table 1 of Example 1 were washed with a 0.2% neutral detergent aqueous solution, and dried. On each mesh fabric, a PVA-vinylacetate type photosensitive emulsion NK-1 (manufactured by Carley Co., Ltd., West Germany) was coated and dried to form a photosensitive coating film of 10 to 12 μm. Then, the photosensitive coating film was printed in the following cross stripes patterns which had different sizes regularly varied in ten steps.

| No. | size of cross stripes | row | line | number of crosses |
|---|---|---|---|---|
| 1 | 0.1 mm × 0.1 mm | 20 | 10 | 200 |
| 2 | 0.2 mm × 0.2 mm | 20 | 10 | 200 |
| 3 | 0.3 mm × 0.3 mm | 20 | 10 | 200 |
| 4 | 0.4 mm × 0.4 mm | 20 | 10 | 200 |
| 5 | 0.5 mm × 0.5 mm | 20 | 10 | 200 |
| 6 | 0.6 mm × 0.6 mm | 20 | 10 | 200 |
| 7 | 0.7 mm × 0.7 mm | 10 | 10 | 100 |
| 0 | 0.8 mm × 0.8 mm | 10 | 10 | 100 |
| 9 | 0.9 mm × 0.9 mm | 10 | 10 | 100 |
| 10 | 1.0 mm × 1.0 mm | 10 | 10 | 100 |

The printing was carried out by using a 4 kw rated high voltage mercury lamp. The distance between the coating film and the mercury lamp was 1.5 meters, and the exposition time interval was 3 minutes. The integrated quantity of light was 400 milli jules/cm².

Followingly, the mesh fabrics having the coating film was dipped in water for 3 min., and was sprayed with water so that the unexposed part of the coating film was removed.

Each mesh fabric having the different cross patterns was subjected to a tape peeling test for measurement of the bonding strength of the cured cross patterns of the photosensitive resin.

Method for Tape Peeling Test

Filament tape #810 made by Sumitomo 3 M Co., Ltd. was adhered on the cross patterns formed on each mesh fabric Thereafter, the tape was peeled off from the mesh fabric. The procedure was repeated three times for the same surface. The number of patterns adhered to the tape were counted.

Table 6 shows the test results. In the table, the numerical values in the column with the heading "first" represent the number of patterns peeled from the mesh fabric by the first tape adhesion. The numerical values in the columns with the headings "second" and "third" represent the total number of peeled patterns after the second and the third tape adhesion, respectively.

TABLE 6

| number of peeled patterns | cross-size number 1 | 2 | 3 | 4 | 5 | 6 | 7 | 8 | 9 | 10 |
|---|---|---|---|---|---|---|---|---|---|---|
| first | | | | | | | | | | |
| A2 | 4 | 0 | 0 | 0 | 0 | 0 | 0 | 0 | 0 | 0 |
| B2 | 16 | 4 | 2 | 2 | 1 | 0 | 0 | 0 | 0 | 0 |
| second | | | | | | | | | | |
| A2 | 4 | 1 | 0 | 0 | 0 | 0 | 0 | 0 | 0 | 0 |
| B2 | 26 | 4 | 4 | 2 | 2 | 1 | 0 | 0 | 0 | 0 |
| third | | | | | | | | | | |
| A2 | 4 | 2 | 0 | 0 | 0 | 0 | 0 | 0 | 0 | 0 |
| B2 | 48 | 20 | 8 | 6 | 6 | 4 | 1 | 0 | 0 | 0 |
| first | | | | | | | | | | |
| A3 | 2 | 0 | 1 | 0 | 0 | 0 | 0 | 0 | 0 | 0 |
| B3 | 14 | 8 | 2 | 4 | 1 | 0 | 0 | 0 | 0 | 0 |
| second | | | | | | | | | | |
| A3 | 2 | 0 | 1 | 0 | 0 | 0 | 0 | 0 | 0 | 0 |
| B3 | 22 | 15 | 8 | 4 | 2 | 1 | 0 | 0 | 0 | 0 |
| third | | | | | | | | | | |
| A3 | 2 | 1 | 1 | 0 | 0 | 0 | 0 | 0 | 0 | 0 |
| B3 | 40 | 17 | 10 | 6 | 4 | 2 | 0 | 0 | 0 | 0 |
| first | | | | | | | | | | |
| A4 | 2 | 0 | 0 | 0 | 0 | 0 | 0 | 0 | 0 | 0 |
| B4 | 15 | 8 | 2 | 2 | 0 | 1 | 0 | 0 | 0 | 0 |
| second | | | | | | | | | | |
| A4 | 2 | 0 | 0 | 0 | 0 | 0 | 0 | 0 | 0 | 0 |
| B4 | 24 | 9 | 7 | 5 | 0 | 1 | 1 | 0 | 0 | 0 |
| third | | | | | | | | | | |
| A4 | 2 | 0 | 1 | 0 | 0 | 0 | 0 | 0 | 0 | 0 |
| B4 | 30 | 17 | 7 | 5 | 1 | 1 | 1 | 0 | 0 | 0 |
| first | | | | | | | | | | |
| A5 | 4 | 0 | 0 | 0 | 0 | 0 | 0 | 0 | 0 | 0 |
| B5 | 16 | 9 | 10 | 2 | 0 | 0 | 0 | 0 | 0 | 0 |
| second | | | | | | | | | | |
| A5 | 4 | 0 | 0 | 0 | 0 | 0 | 0 | 0 | 0 | 0 |
| B5 | 18 | 11 | 10 | 2 | 1 | 0 | 0 | 0 | 0 | 0 |
| third | | | | | | | | | | |
| A5 | 4 | 1 | 0 | 0 | 0 | 0 | 0 | 0 | 0 | 0 |
| B5 | 33 | 11 | 10 | 2 | 2 | 1 | 0 | 0 | 0 | 0 |

The symbols A2 to A5 and B2 to B5 designate the same mesh fabrics as listed in Table 1 of Example 1, respectively.

Example 5

After heat-setting of the mesh fabrics as listed in Table 1 of Example 1, E.P.C. and the tensile modulus of elasticity of the fabrics were measured, and compared with those of conventional polyester mesh fabrics. The results are shown in Table 7 and Table 8.

E.P.C.

It represents the physical properties of fibres as Elastic Performance Coefficients, which involve the recovery properties of the fibres after the subjection to mechanical action.

Figure 6:
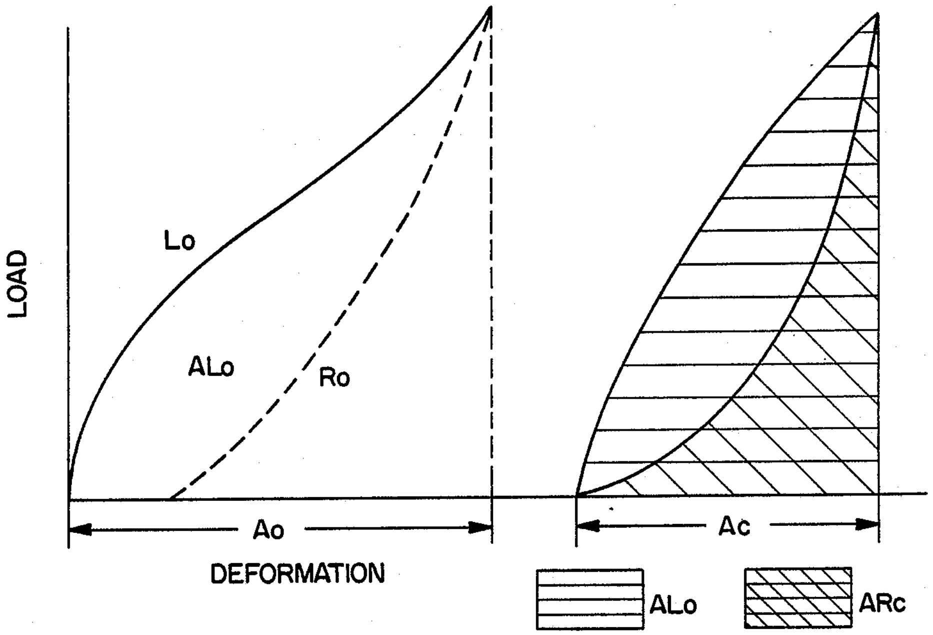
FIG. 6 illustrates graphically a correlation between the load and the deformation of the fibres.

The correlations between the load and deformation of a fibre at the first and the n-th cycle of the load and deformation test are illustrated in such a manner as shown in FIG. 6.

In the figure, the symbols represent the following:

$L_o$: load and deformation curve of a fibre at the first cycle of the test, $L_c$: load and deformation curve of the fibre at the conditioning, $R_o$: recovery curve of the fibre at the first cycle of the test, $R_c$: recovery curve of the fibre at the conditioning, $a_o$: deformation of the fibre by loading at the first cycle, and $a_c$: deformation of the fibre by loading at the conditioning The symbol A such as A in $AL_o$ and so forth designates an energy value required for the deformation or the recovery of the fibre.

The ratio of $AR_o$ to $Al_o$ indicates the degree of recovery-performance of the fibre at the conditioning, and is a linear function of the tension speed.

$a_o^2/AL_o$ indicates the degree of energy absorption to the deformation generated at the first cycle.

$a_c^2/AL_c$ indicates the degree of energy absorption to the deformation energy at the conditioning.

Accordingly, E.P.C. is expressed by the following equation using these ratios and the correction item $AR_o/AL_o$.

$$E.P.C. = \frac{\frac{a_c^2}{AL_c}\,\frac{AR_c}{AL_c}}{\frac{a_o^2}{AL_o}}$$

In case that the fibre can be recovered: $AR_o = AL_o$, $a_o = a_c$, $AL_o = AL_c$, $AR_o = AR_e$, E.P.C. $= 1$ In case that the fibre cannot be recovered: $AR = 0$, $AR_c = AL_c$, $a_c = a_o$, E.P.C. $= 0$

[See "TEXTILE PHYSICS" Maurzen, p. 254–255 (1979)]

Tensile Modulus of Elasticity

This test method is in accordance with JIS L 1096.

An automatic recorder equipped, constant speed tensile tester is used. The distance between the grips for a specimen is 20 cm. The tension speed is a rate of 10% of the grip distance per 1 minutes. The specimen is stretched till a predetermined load is obtained. Successively, the specimen is unloaded at the same speed as that at loading. Then, the specimen is stretched at the same speed till the predetermined load is obtained. The residual elongation is measured from the recorded load-elongation curves. The tensile modulus of elasticity is calculated from the following equation:

$$\text{tensile modulus of elasticity} = \frac{L - L_1}{L} \times 100$$

where L is an elongation (mm) at a predetermined load, and $L_1$ is a residual elongation (mm) at the predetermined load.

E.P.C. and the tensile modulus of elasticity were measured under the following conditions:

Test Method: according to the labelled strip method of JIS L 1068 (1968)

Testing Machine: Constant-Speed Stretching Type tester (made by Shimadzu Corporation, Type S-500)

Test Conditions: temperature 20° C., R.H. 65% specimen width 5 cm, grip distance 20 cm tension speed 10 cm/min. cycle number 20

Experiment Times: 50

TABLE 7

| | E.P.C. | | | | | | | | | |
|---|---|---|---|---|---|---|---|---|---|---|
| load (kgf) | conjugate monofilament fabric (A1) | polyester fabric (B1) | conjugate monofilament fabric (A2) | polyester fabric (B2) | conjugate monofilament fabric (A3) | polyester fabric (B3) | conjugate monofilament fabric (A4) | polyester fabric (B4) | conjugate monofilament fabric (A5) | polyester fabric (B5) |
| 5 | 1.00 | 1.00 | 1.00 | 1.00 | 1.00 | 1.00 | 1.00 | 1.00 | 1.00 | 1.00 |
| 10 | 0.98 | 0.79 | 1.00 | 0.90 | 1.00 | 0.93 | 0.97 | 0.75 | 1.00 | 0.81 |
| 15 | 0.93 | 0.67 | 0.92 | 0.79 | 0.94 | 0.80 | 0.94 | 0.64 | 0.96 | 0.69 |
| 20 | 0.86 | 0.55 | 0.85 | 0.61 | 0.88 | 0.70 | 0.88 | 0.52 | 0.90 | 0.56 |
| 25 | 0.81 | 0.46 | 0.81 | 0.54 | 0.81 | 0.66 | 0.80 | 0.43 | 0.83 | 0.48 |
| 30 | 0.73 | | 0.74 | 0.45 | 0.75 | 0.44 | 0.73 | | 0.77 | |
| 35 | 0.62 | | 0.66 | 0.40 | 0.70 | | 0.66 | | 0.70 | |
| 40 | 0.51 | | 0.59 | | 0.65 | | | | 0.64 | |

TABLE 8

| | Tensile Modulus of Elasticity | | | | | | | | | |
|---|---|---|---|---|---|---|---|---|---|---|
| load (kgf) | conjugate monofilament fabric (A1) | polyester fabric (B1) | conjugate monofilament fabric (A2) | polyester fabric (B2) | conjugate monofilament fabric (A3) | polyester fabric (B3) | conjugate monofilament fabric (A4) | polyester fabric (B4) | conjugate monofilament fabric (A5) | polyester fabric (B5) |
| 5 | 100.0 | 100.0 | 100.0 | 100.0 | 100.0 | 100.0 | 100.0 | 100.0 | 100.0 | 100.0 |
| 10 | 99.1 | 89.8 | 100.0 | 93.3 | 100.0 | 95.0 | 98.3 | 94.0 | 100.0 | 94.1 |
| 15 | 96.8 | 82.0 | 97.7 | 86.9 | 98.6 | 87.3 | 95.7 | 87.5 | 97.9 | 88.0 |
| 20 | 93.3 | 70.0 | 93.2 | 79.4 | 92.5 | 74.5 | 91.1 | 80.9 | 93.5 | 76.0 |
| 25 | 88.6 | 65.3 | 88.8 | 68.2 | 89.2 | 68.5 | 88.4 | 68.8 | 88.0 | 64.0 |
| 30 | 82.7 | | 82.2 | 60.1 | 82.6 | 60.2 | 83.6 | | 83.2 | |
| 35 | 75.9 | | 74.6 | 51.8 | 75.5 | | 75.9 | | 76.1 | |
| 40 | 70.0 | | 69.9 | | 70.3 | | | | 70.4 | |

The test results in Table 7 and Table 8 indicate that the mesh fabrics A1, A2, A3, A4 and A5 according to the present invention are excellent in the recovery property and undergo a less change at a higher load applied as compared with the conventional polyester fabrics B1, B2, B3, B4 and B5, and further have a high elastic recovery ratio and a high recoverability after subjected to mechanical action.

Accordingly, the present mesh fabrics have a durability remarkably improved as a printing screen and also high printing performances, which are attributed to the enhancement in the recovery property.

Example 6

The mesh fabrics as listed in Table 1 of Example 1 were heat-set, and fixed to an aluminum frame with a screen stretching machine, respectively. The stretched mesh fabrics were washed with water and dried. To each of the stretched mesh fabrics, a PVA-vinylacetate type photosensitive resin emulsion NK-14 manufactured by Carley Co., Ltd. was applied by lap-coating method, and dried. The thickness of the coating film was 12 $\mu$m. The photosensitive coating film formed on the mesh fabric was cured by exposure to light so as to have the following two patterns;

(1) a lattice-form pattern in which thin lines are crossed at a 150 mm interval to each other in the warp and the weft direction, and (2) a pattern in which two groups of five thin lines of each of 50 $\mu$m, 60 $\mu$m, 80 $\mu$m, 100 $\mu$m, 125 $\mu$m, 150 $\mu$m, 200 $\mu$m, 250 $\mu$m and 300 $\mu$m wide in parallel at an equal distance are arranged.

The printing discrepancy is measured by using the pattern (1) at the number of printing times of 1,000 and 3,000. The reproducibility of thin line was measured by using the pattern (2).

The curing was conducted by means of a 3 kw rated metal halide lamp. The distance between the metal halide lamp and the coating film on the mesh fabric was 80 cm. The exposure time was 2 minutes. After the exposure, the mesh fabric was dipped in water for 3 minutes, and injected with water, so that the unexposed part of the coating film was removed.

As described above, the printing discrepancy and the thin line reproducibility of the mesh fabrics each having the cured pattern (1) or (2) were measured for evaluation of the printing precision of the mesh fabrics. Tables 9, 10 tabulate the test results.

Conditions for Producing Screen Stencil:
- Screen stretching machine: 3S Air Stretcher (made by Mino Group, normal stretching type)
- Tension: 1.00 mm (at completion of the stretching)
- Emulsion: NK-14 (made by Carley Co., Ltd., West Germany)
- Thickness of coating film: 12 $\mu$m
- Frame: 880 mm×880 mm (made of aluminum)
- Printing image: 300 mm×300 mm Conditions of Squeegee:
- Material: polyurethane
- Hardness: 70°
- Angle: 75°
- Width: 405 cm Printing Conditions:
- Gap: 3.0 mm
- Impression: 1.5 mm
- Ink: UV ink 5104-T6 (made by Mitsui Toatsu Chemicals, Inc.)
- Viscosity of ink: 200 PS

TABLE 9

| printing position number | Printing Precision (μm) - Pattern (1) | | | | | | | | | | | |
|---|---|---|---|---|---|---|---|---|---|---|---|---|
| | conjugate monofilament fabric (A2) | | polyester fabric (B2) | | conjugate monofilament fabric (A3) | | polyester fabric (B3) | | conjugate monofilament fabric (A5) | | polyester fabric (B5) | |
| of print ing times | 1,000 times | 3,000 times | 1,000 times | 3,000 times | 1,000 times | 3,000 times | 1,000 times | 3,000 times | 1,000 times | 3,000 times | 1,000 times | 3,000 times |
| 1 | 39 | 55 | 95 | 138 | 43 | 54 | 108 | 146 | 35 | 50 | 115 | 148 |
| 2 | 43 | 74 | 101 | 140 | 62 | 77 | 106 | 165 | 53 | 79 | 108 | 170 |
| 3 | 58 | 81 | 120 | 164 | 55 | 74 | 124 | 169 | 70 | 81 | 127 | 193 |
| 4 | 46 | 57 | 92 | 120 | 51 | 70 | 98 | 121 | 48 | 60 | 97 | 130 |
| 5 | 66 | 85 | 108 | 142 | 74 | 86 | 107 | 168 | 55 | 80 | 104 | 172 |
| 6 | 70 | 78 | 106 | 159 | 57 | 85 | 96 | 155 | 66 | 82 | 99 | 168 |
| 7 | 46 | 67 | 100 | 126 | 36 | 51 | 98 | 133 | 36 | 64 | 101 | 141 |
| 8 | 54 | 70 | 99 | 151 | 58 | 73 | 100 | 170 | 46 | 73 | 94 | 165 |
| 9 | 73 | 91 | 114 | 161 | 69 | 73 | 124 | 172 | 69 | 77 | 130 | 185 |

TABLE 10

| Thin Line Printing Resolution Properties | | | |
|---|---|---|---|
| conjugate monofilament fabric | | polyester fabric | |
| A2 | 100 μm | B2 | 150 μm |
| A3 | 80 μm | B3 | 150 μm |
| A5 | 60 μm | B5 | 125 μm |

Example 7

E.P.C. and the tensile modulus of elasticity of the mesh fabrics after the 3,000 times screen printing as shown in Table 9 of Example 6 were measured, and compared with those of the conventional polyester fabrics. The test results are shown in Table 11 and Table 12. The test method was the same as described in Example 5.

TABLE 11

| load (kgf) | E. P. C. after Printing | | | | | | | | | | | |
|---|---|---|---|---|---|---|---|---|---|---|---|---|
| | conjugate monofilament mesh fabric (A2) | | polyester monofilament fabric (B2) | | conjugate monofilament mesh fabric (A3) | | polyester monofilament fabric (B3) | | conjugate monofilament mesh fabric (A4) | | polyester monofilament fabric (B4) | |
| | 0 time | 3,000 times | 0 time | 3,000 times | 0 time | 3,000 times | 0 time | 3,000 times | 0 time | 3,000 times | 0 time | 3,000 times |
| 5 | 1.00 | 1.00 | 1.00 | 0.74 | 1.00 | 1.00 | 1.00 | 0.77 | 1.00 | 1.00 | 1.00 | 0.70 |
| 10 | 1.00 | 0.94 | 0.90 | 0.66 | 1.00 | 0.93 | 0.93 | 0.68 | 1.00 | 0.94 | 0.81 | 0.62 |
| 15 | 0.92 | 0.90 | 0.79 | 0.52 | 0.94 | 0.86 | 0.80 | 0.55 | 0.96 | 0.90 | 0.69 | 0.51 |
| 20 | 0.85 | 0.81 | 0.61 | 0.40 | 0.88 | 0.80 | 0.70 | 0.42 | 0.90 | 0.83 | 0.56 | 0.39 |
| 25 | 0.81 | 0.76 | 0.54 | 0.31 | 0.81 | 0.74 | 0.66 | 0.36 | 0.83 | 0.77 | 0.48 | 0.27 |
| 30 | 0.74 | 0.69 | 0.45 | 0.24 | 0.75 | 0.66 | 0.44 | 0.27 | 0.77 | 0.71 | | |
| 35 | 0.66 | 0.60 | 0.40 | 0.19 | 0.70 | 0.60 | | | 0.70 | 0.66 | | |
| 40 | 0.59 | 0.54 | | | 0.65 | 0.56 | | | 0.64 | 0.56 | | |

TABLE 12

| load (kgf) | Tensile Modulus of Elasticity (%) | | | | | | | | | | | |
|---|---|---|---|---|---|---|---|---|---|---|---|---|
| | conjugate monofilament mesh fabric (A2) | | polyester monofilament fabric (B2) | | conjugate monofilament mesh fabric (A3 | | polyester monofilament fabric (B3) | | conjugate monofilament mesh fabric (A4) | | polyester monofilament fabric (B4) | |
| | 0 time | 3,000 times | 0 time | 3,000 times | 0 time | 3,000 times | 0 time | 3,000 times | 0 time | 3,000 times | 0 time | 3,000 times |
| 5 | 100.0 | 100.0 | 100.0 | 80.5 | 100.0 | 100.0 | 100.0 | 81.1 | 100.0 | 100.0 | 100.0 | 78.4 |
| 10 | 100.0 | 98.3 | 93.3 | 72.9 | 100.0 | 97.8 | 95.0 | 72.8 | 100.0 | 98.5 | 94.1 | 69.7 |
| 15 | 97.7 | 95.5 | 86.9 | 65.5 | 98.6 | 94.8 | 87.3 | 66.7 | 97.9 | 93.7 | 88.0 | 60.0 |
| 20 | 93.2 | 89.9 | 79.4 | 57.0 | 92.5 | 88.1 | 74.5 | 59.3 | 93.5 | 89.3 | 76.0 | 55.1 |
| 25 | 88.8 | 84.0 | 68.2 | 46.1 | 89.2 | 85.6 | 68.5 | 47.2 | 88.0 | 84.6 | 64.0 | 44.2 |
| 30 | 82.2 | 79.1 | 60.1 | 39.8 | 82.6 | 78.9 | 60.2 | 38.6 | 83.2 | 78.8 | | |
| 35 | 74.6 | 72.6 | 51.8 | 29.7 | 75.5 | 74.0 | | | 76.1 | 72.4 | | |
| 40 | 69.9 | 65.5 | | | 70.3 | 65.4 | | | 70.4 | 65.0 | | |

As shown in Table 9 and Table 10, the mesh fabrics A2, A3 and A5 according to the invention have high printing precision and thin-line printing resolution property, and are advantageously applicable for high-density, high-precision printing.

On the contrary, the conventional polyester mesh fabrics B2, B3 and B5 were inferior in the thin-line printing resolution property. As the number of printing times was increased, the printing precision was remarkably reduced.

The test results in Table 11 and Table 12 indicate that the present mesh fabrics A2, A3 and A5 have high after-printing E.P.C. and tensile modulus of elasticity which enhance the printing precision and printing durability of the fabrics. Accordingly, the present mesh fabrics are advantageously applicable for high-density, high precision screen printing.

On the contrary, in the case of the conventional polyester monofilament fabrics B2, B3 and B5, as the number of the printing times was increased, the printing durability of the fabrics was reduced. Conventional nylon monofilament fabrics, of which the test results are not presented herein, are inferior to the polyester monofilament mesh fabrics in the tensile modulus of elasticity. Accordingly, the conventional nylon monofilament mesh fabrics are unsuitable for application to high-density, high-precision screen printing.

Example 8

By following substantially the procedure described in Example 1 with respect to the mesh fabrics A1 to A5 and by adding yellow pigment (PID yellow No. 83, made by Repino Colour Kogyo Co., Ltd.) to the material of the sheath of the conjugate filaments, mesh fabrics X1 to X5 were obtained from the conjugate filaments each comprising the dope yellow-coloured sheath.

On the other hand, the mesh fabrics A1 to A5 as described in Example 1 were dyed in yellow colour, so that the mesh fabrics Y1 to Y5 made of the conjugate filaments each comprising the dyed sheath were obtained. Further, for comparison, the mesh fabrics B1 to B5 as described in Example 1 were dyed in yellow colour in the conditions as described in Table 13, so that the yellow-coloured polyester mesh fabrics Z1 to Z5 were obtained.

All the mesh fabrics exhibited a halation resisting property when exposed to light for the photomechanical process.

As understood from Table 13, the mesh fabrics X1 to X5 made of the conjugate filaments each comprising the dope-coloured sheath had no heat shrinking, and could be processed for forming a screen stencil with keeping the high qualities of the fabrics, whatever pattern may be formed on the screen. This is attributed to the unnecessity of the mesh fabrics X1 to X5 to be subjected to a dyeing process with low workability.

The present mesh fabrics Y1 to Y5 could be rendered halation preventive relatively easily. As the mesh fabrics Y1 to Y5 are unnecessary to be subjected to severe conditions for the dyeing, the deformation of the fabrics are relatively small. The mesh fabrics Y1 to Y5 are advantageously applicable for the process of a screen stencil having a finer pattern with high process stability.

On the contrary, the conventional polyester mesh fabrics Z1 to Z5 require severe conditions for the dyeing, and are heat shrinked to large extent. Accordingly, the mesh fabrics Z1 to Z5 are unsuitable for the process of a screen stencil having a fine pattern.

TABLE 13

| type of fabrics | | | | dyeing conditions | | | heat shrinkage(%) | | |
|---|---|---|---|---|---|---|---|---|---|
| No | mesh | materials | | pressure | preparation time | dyeing time | warp | weft | average |
| X1 | 150 | dope-coloured conjugate monofilaments | 48 μm | 0 | 0 | 0 | 0 | 0 | 0 |
| X2 | 200 | dope-coloured conjugate monofilaments | 48 μm | " | 0 | 0 | 0 | 0 | 0 |
| X3 | 250 | dope-coloured conjugate monofilaments | 40 μm | " | 0 | 0 | 0 | 0 | 0 |
| X4 | 270 | dope-coloured conjugate monofilaments | 34 μm | " | 0 | 0 | 0 | 0 | 0 |
| X5 | 300 | dope-coloured conjugate monofilaments | 34 μm | " | 0 | 0 | 0 | 0 | 0 |
| Y1 | 150 | dyed conjugate monofilaments | 48 μm | atomospheric pressure | 1.0 | 0.5 | 4.8 | 4.0 | 4.4 |
| Y2 | 200 | " | 48 μm | atomospheric pressure | " | " | 4.7 | 4.5 | 4.6 |
| Y3 | 250 | " | 40 μm | atomospheric pressure | " | " | 4.6 | 4.4 | 4.5 |
| Y4 | 270 | " | 34 μm | atomospheric pressure | " | " | 5.2 | 4.5 | 4.4 |
| Y5 | 300 | " | 34 μm | atomospheric pressure | " | " | 5.3 | 4.6 | 4.5 |
| Z1 | 150 | dyed polyester monofilaments | 48 μm | high pressure | 4.0 | 2.0 | 13.8 | 13.5 | 13.7 |
| Z2 | 200 | " | 48 μm | high pressure | " | " | 13.7 | 13.4 | 13.6 |
| Z3 | 250 | " | 40 μm | high pressure | " | " | 13.8 | 13.6 | 13.7 |
| Z4 | 270 | " | 34 μm | high pressure | " | " | 14.1 | 13.6 | 13.9 |
| Z5 | 300 | " | 34 μm | high pressure | " | " | 14.0 | 13.8 | 13.9 |

Example 9

Electron micrographs of the mesh fabrics X1 to X5, Y1 to Y5 and Z1 to Z5 were taken to examine the surface state, and compared with each other. Table 14 shows the test results.

TABLE 14

| type of fabrics | | | | surface state |
|---|---|---|---|---|
| No. | mesh | materials | | of fabric |
| X1 | 150 | dope-coloured conjugate monofilaments | 48 μm | no foreign matters, clean |
| X2 | 200 | dope-coloured conjugate monofilaments | 48 μm | no foreign matters, clean |
| X3 | 250 | dope-coloured conjugate monofilaments | 40 μm | no foreign matters, clean |
| X4 | 270 | dope-coloured conjugate monofilaments | 34 μm | no foreign matters, clean |
| X5 | 300 | dope-coloured conjugate monofilaments | 34 μm | no foreign matters, clean |

TABLE 14-continued

| No. | mesh | type of fabrics materials | | surface state of fabric |
|---|---|---|---|---|
| Y1 | 150 | dyed conjugate monofilaments | 48 μm | less foreign matters |
| Y2 | 200 | dyed conjugate monofilaments | 48 μm | less foreign maters |
| Y3 | 250 | dyed conjugate monofilaments | 40 μm | less foreign matters |
| Y4 | 270 | dyed conjugate monofilaments | 34 μm | less foreign matters |
| Y5 | 300 | dyed conjugate monofilaments | 34 μm | less foreign matters |
| Z1 | 150 | dyed polyester monofilaments | 48 μm | a lot of foreign matters |
| Z2 | 200 | dyed polyester monofilaments | 48 μm | a lot of foreign matters |
| Z3 | 250 | dyed polyester monofilaments | 40 μm | a lot of foreign matters |
| Z4 | 270 | dyed polyester monofilaments | 34 μm | a lot of foreign matters |
| Z5 | 300 | dyed polyester monofilaments | 34 μm | a lot of foreign matters |

Figure 7:
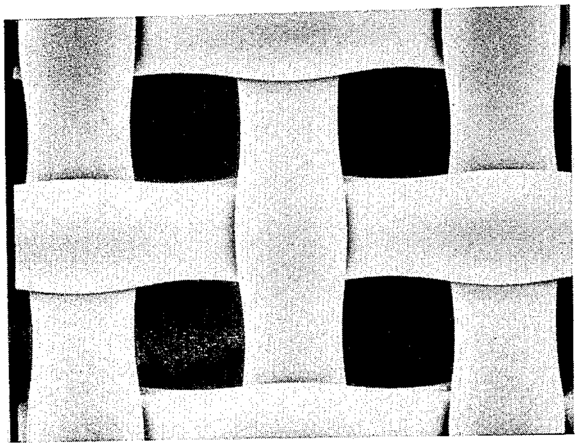
FIG. 7 shows a microscope photograph (magnification: 500) of a mesh fabric with the mesh size of 250 made of dope-dyed conjugate monofilaments.
Figure 8:
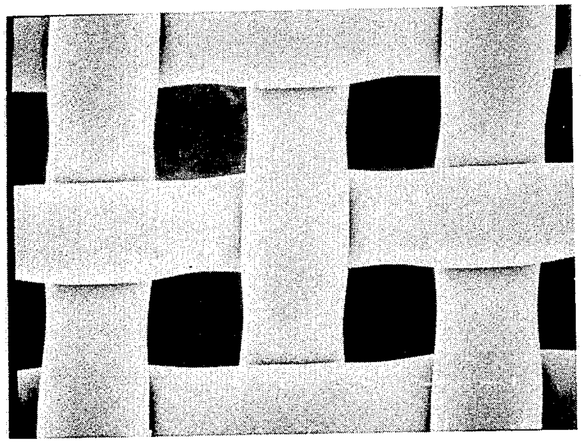
FIG. 8 shows a microscope photograph (magnification: 500) of a dyed mesh fabric with the mesh size of 250 made of conjugate monofilaments.
Figure 9:
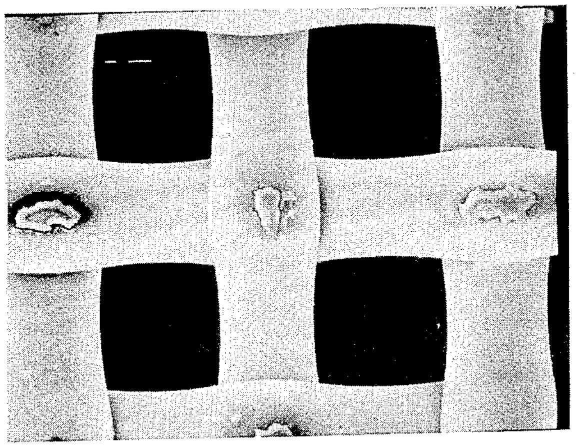
FIG. 9 shows a microscope photograph (magnification: 500) of a dyed mesh fabric with the mesh size of 250 made of polyester monofilaments.
Figure 10:
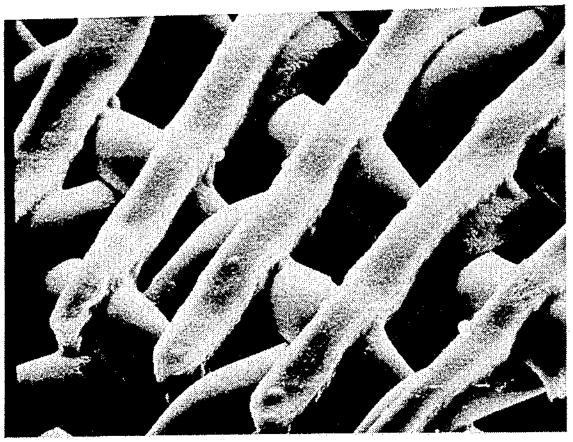
FIG. 10 shows a microscope photograph (magnification: 500) of a printing screen produced by processing a mesh fabric with the mesh size of 300 made of dope-dyed conjugate monofilaments.
Figure 11:
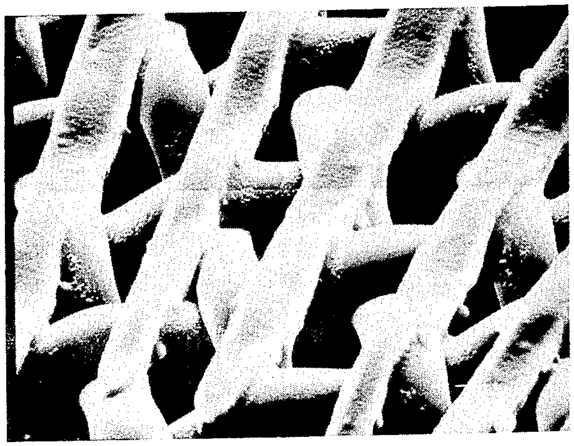
FIG. 11 shows a microscope photograph magnification: 500) of a printing screen produced by processing a dyed mesh fabric with the mesh size of 300 made of conjugate monofilaments.

FIGS. 7 to 9 represent the microphotographs (magnification: of the mesh fabrics X3, Y3 and Z3, respectively. As understood from Table 14 and FIGS. 7 to 9, the present mesh fabrics X1 to X5 made from the dope-coloured conjugate monofilaments had a very clean surface. The present mesh fabrics Y1 to Y5 made of the dyed conjugate monofilaments were high-quality products which had less foreign matters adhered thereto, as compared with the conventional mesh fabrics Z1 to Z5 made from the polyester monofilaments.

Example 10

The mesh fabrics X1 to X5, Y1 to Y5, and Z1 to Z5 as described in Example 8, and the undyed mesh fabrics A1 to A5 and B1 to B5 as described in Example 1 were washed with a 0.2% neutral detergent aqueous solution, and dried. To each of the mesh fabrics, a PVA-vinylacetate type photosensitive resin emulsion NK-14 (made by Hoechst Co., Ltd.) were applied by lap-coating, and dried. The thickness of. the coating films formed on the mesh fabrics was in the range of 10 μm to 12 μm. Each mesh fabric having the photosensitive coating film was cured by exposure to light so as to have a fine pattern thereon.

The mesh fabrics each having the fine pattern were observed by use of an electron microscope. Table 15 shows the observation results.

TABLE 15

| No. | type of fabrics materials | halation prevention effect | state of pattern | total evaluation |
|---|---|---|---|---|
| X1～X5 | dope-coloured conjugate monofilaments | ◎ | ◎ | A |
| Y1～Y5 | dyed conjugate monofilaments | ○ | ◎ | B |
| Z1～Z5 | dyed polyester monofilaments | ○ | X | D |
| A1～A5 | undyed conjugate monofilaments | Δ | ○ | C |
| B1～B5 | undyed polyster monofilaments | X | Δ | D |

Figure 12:
FIG. 12 shows a microscope photograph (magnification: 500) of a printing screen produced by processing a dyed mesh fabric with the mesh size of 300 made of polyester monofilaments.

The marks indicate the following, respectively:
(the halation prevention effect)
◎ superior in halation prevention effect
○ good in prevention effect
Δ prior in halation prevention effect
X producing a halation
(state of pattern)
◎ high bonding strength, very clear in the whole pattern
○ high bonding strength, clear in the pattern edges
Δ low bonding strength, poor in the pattern edges
X substantially no bonding strength, incapable of forming a pattern
(total evaluation)
A superior in both of halation prevention effect and bonding strength
B good in both of halation prevention effect and bonding strength
C poor in either one of halation prevention effect or bonding strength
D poor in both of halation prevention effect and bonding strength FIGS. 10 to 14 show the microphotographs (magnification: 500) of the mesh fabrics X5, Y5, Z5 and A5, and B5 each having the fine pattern formed thereon as described above. As these results and Table 14 indicate clearly, the present mesh fabrics, whether they are dyed or dope-coloured, had high halation prevention effect, and could be precisely provided with a pattern thereon as a screen stencil (see FIGS. 10 and 11, and the columns of X1 to X5 and Y1 to Y5 in Table 14). On the contrary, the conventional polyester monofilament mesh fabrics, though they could be rendered halation resistant by the dyeing, the fibrous surfaces of the conventional mesh fabrics became irregular, as shown in FIGS. 9 and 12, and the bonding strength was reduced by the dyeing. Accordingly, the conventional polyester monofilament fabrics could not be provided with a definite pattern thereon (see the columns of Z1 to Z5 in Table 14).

Figure 13:
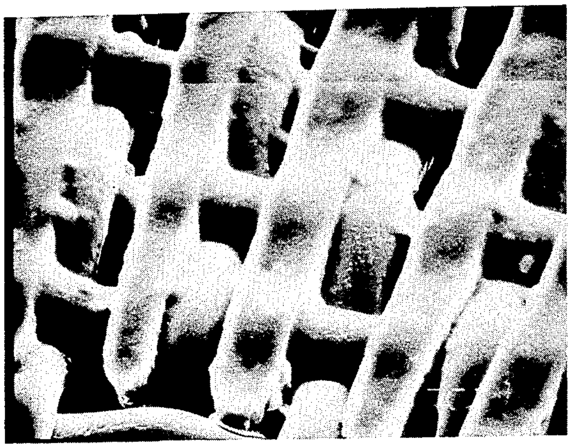
FIG. 13 shows a microscope photograph (magnification 500) of a printing screen produced by processing an uncolored mesh fabric with the mesh size of 300 made of conjugate monofilaments.
Figure 14:
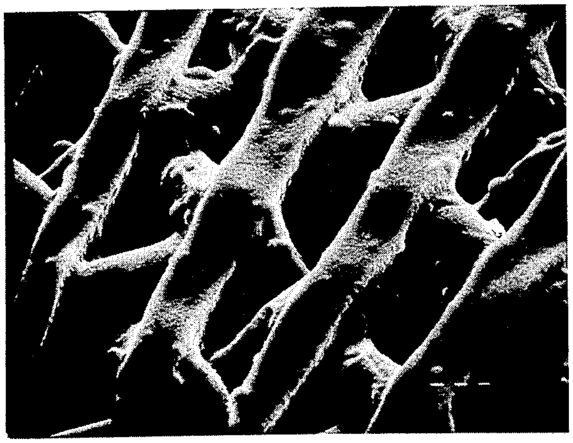
FIG. 14 shows a microscope photograph (magnification: 500) of a printing screen produced by processing an uncolored mesh fabric with the mesh size of 300 made of conjugate monofilaments.

The mesh fabrics of the invention, which are not dyed, can be provided with a pattern thereon (see FIG. 13 and the columns of A1 to A5 in Table 14). In the case of the conventional polyester filament mesh fabrics, a definite pattern cannot be formed thereon, because of occurring of blurs and fogs on the pattern (see the columns of B1 to B5 in Table 14).

Industrial Applicability of the Invention

A mesh fabric of the invention has high dimensional stability, mechanical strength and bonding strength to a resin, which enables a precision printing screen to be processed with high production efficiency. Further, the present mesh fabric has high anti-static property, and provides a high workability during the use as a printing screen.

The present mesh fabric makes it possible to process a screen which has high ink squeezing properties and undergoes extremely less changes in the quality with the lapse of time and substantially no-discrepancy in the printings.

Accordingly, the mesh fabric of the invention is suitable for mass-production of screens to be applied to precision printing of electronic parts such as printed circuits, multiply boards, IC circuits, and so forth, with inexpensiveness and high production efficiency.

What is claimed is:

1. A mesh fabric useful for a printing screen consisting essentially of conjugate filaments, each of said conjugate filaments being composed of a sheath and a core, said sheath being formed of a material having high adhesive property to an emulsion and a resin used for making the screen, said core being formed of a material having high dimensional stability and elastic recovery property, said mesh fabric having a breaking elongation of from 15 to 40 % and a breaking strength of not less than 25 kgf, and having a correlation between the strength Y (kgf) and the elongation X (%) in the elongation range of not less than 5%, in the stress-strain curve of the mesh fabric by the labelled strip method at the specimen width of 5 cm and the grip interval of 20 cm satisfying the following formula:

$$Y \geqq (X+1) \times 5/3.$$

2. The mesh fabric according to claim 1, wherein the conjugate filament is a monofilament.

3. The mesh fabric according to claim 1, wherein the ratio by volume of the core to the sheath is in the range of from 1:5 to 3:1.

4. The mesh fabric according to claim 1, wherein the ratio by volume of the core to the sheath is in the range of from 1:2 to 2:1.

5. A mesh fabric according to claim 1, wherein the sheath of the conjugate filament is formed of a polyamide or a low viscosity type polyester.

6. The mesh fabric according to claim 1, wherein the core of the conjugate filament is formed of a polyester or a polyolefin.

7. The mesh fabric according to claim 1, wherein the sheath of the conjugate filament is formed of a polyamide, and the core of said conjugate filament is formed of a polyester.

8. The mesh fabric according to claim 1, wherein the sheath of the conjugate filament has a light absorptive property at least in the surface of the sheath to the exposure light in the photomechanical process for making a screen stencil.

9. The mesh fabric according to claim 8, wherein the sheath of the conjugate filament is one incorporated by a pigment and/or a ultra-violet ray absorbing agent to have a light absorptive property to the exposure light in the photomechanical process.

10. The mesh fabric according to claim 8, wherein the sheath of the conjugate filament is one dyed to have a light absorptive property to the exposure light in the photomechanical process.

11. A mesh fabric according to claim 1, wherein the sheath of the conjugate filament has a light absorptive property to the exposure light in the photomechanical process having a wave length within the range of from 280 to 450 nm.

* * * * *